(12) United States Patent
Hirko

(10) Patent No.: US 9,986,745 B2
(45) Date of Patent: Jun. 5, 2018

(54) CORING MACHINE

(71) Applicant: DAS Foods, LLC, Palmyra, PA (US)

(72) Inventor: Benjamin Joseph Hirko, Coralville, IA (US)

(73) Assignee: DAS Foods, LLC, Palmyra, PA (US)

( * ) Notice: Subject to any disclaimer, the term of this patent is extended or adjusted under 35 U.S.C. 154(b) by 0 days. days.

(21) Appl. No.: 15/635,797

(22) Filed: Jun. 28, 2017

(65) Prior Publication Data
US 2017/0295807 A1 Oct. 19, 2017

Related U.S. Application Data

(62) Division of application No. 14/290,119, filed on May 29, 2014, now Pat. No. 9,723,849.

(60) Provisional application No. 61/828,293, filed on May 29, 2013.

(51) Int. Cl.
A22C 17/00 (2006.01)
B23B 39/16 (2006.01)
B23B 39/22 (2006.01)
B23B 41/02 (2006.01)
A23L 13/00 (2016.01)
A23P 30/10 (2016.01)

(52) U.S. Cl.
CPC .......... *A22C 17/002* (2013.01); *A23L 13/03* (2016.08); *A23P 30/10* (2016.08); *B23B 39/167* (2013.01); *B23B 39/22* (2013.01); *B23B 41/02* (2013.01); *A23V 2002/00* (2013.01); *B23B 2270/08* (2013.01); *B23B 2270/14* (2013.01)

(58) Field of Classification Search
CPC ........ A22C 17/002; A23L 13/03; A23P 30/10; B23B 39/167; B23B 39/22; B23B 41/02; B23B 2270/08; B23B 2270/14; A23V 2002/00
See application file for complete search history.

(56) References Cited

U.S. PATENT DOCUMENTS

| | | | | | |
|---|---|---|---|---|---|
| 1,384,013 | A | * | 7/1921 | Ehrlich | A23N 4/14 99/543 |
| 1,923,069 | A | * | 8/1933 | Bach | A21C 15/04 408/67 |
| 2,139,695 | A | * | 12/1938 | Jacobs | A23N 4/14 99/541 |
| 2,154,789 | A | * | 4/1939 | Thompson | A23N 4/14 99/544 |
| 3,434,517 | A | * | 3/1969 | May | A23N 3/00 99/544 |
| 3,538,840 | A | * | 11/1970 | Nelson | A21C 15/007 426/281 |
| 3,612,124 | A | * | 10/1971 | Cunningham | A23N 15/003 99/490 |
| 3,680,615 | A | * | 8/1972 | Catalina | A23N 15/00 83/425.2 |

* cited by examiner

Primary Examiner — Anthony Weier
(74) Attorney, Agent, or Firm — Design IP

(57) ABSTRACT

In one respect, the invention is a coring machine for removing portions of food item blanks, the coring machine including a plate assembly for holding the food item blanks and a pair of coring assemblies, each having a plurality of coring bits that are aligned with passages in the plate assembly.

13 Claims, 9 Drawing Sheets

CORING MACHINE

The present application is a continuous of U.S. application Ser. No. 14/290,119, filed May 29, 2014, which claims the benefit of U.S. Provisional Application Ser. No. 61/828,293, filed May 29, 2013, the entire contents of which are hereby expressly incorporated by reference.

FIELD OF THE INVENTION

The present invention relates to machines for coring items and related methods of use, more particularly to a coring machine for providing cores in food items and related methods of use.

BACKGROUND

Specialized machinery is required in order to produce food products having specialized shapes. In the case of pre-cooked food items, for example meat products, known methods are not well suited for shaping the food item into novelty products. Molding, for example, requires the application of heat and pressure to the components of the food product, which would require that the machine operate with at least partially uncooked or uncured starting material. In addition, for a tubular-shaped or other hollowed-out food product, molding would require the use of a removable insert in order to provide the hollow inner portion of the food product. The use of inserts may cause problems related to consistent placement of the insert within the mold, in addition to introducing the additional challenge of removing the insert from the cooked food item after molding without damaging the food product. A tubular or hollowed-out food product may also be extruded; however, such a process is undesirable because uncured or uncooked starting material is required to facilitate extrusion.

Accordingly, there is a need for an invention for coring food items that overcomes these and other problems present in the prior art.

SUMMARY OF THE INVENTION

In one respect, the invention is a machine comprising a frame; a plate assembly that is connected to the frame and operationally configured to releasably support at least one food item blank, the plate assembly comprising at least one passage therein, the at least one passage extending to at least one exterior surface of the plate assembly; and at least one coring assembly that is connected to the frame, the at least one coring assembly comprising at least one coring bit that is axially aligned with the at least one passage such that the at least one coring bit can be at least partially inserted within the at least one passage.

In another respect, the invention is a machine comprising a frame including a pair of slide rails; a plate assembly, the plate assembly being slideably connected to the frame along the pair of slide rails along a plate assembly movement axis and operationally configured to releasably support at least one food item blank, the plate assembly including at least one passage therein, the at least one passage extending to at least one exterior surface of the plate assembly; and at least one coring assembly that is fixedly connected to the frame, the at least one coring assembly including at least one coring bit that is axially aligned with the at least one passage such that the at least one coring bit is at least partially inserted within the at least one passage when the plate assembly is slid along the pair of slide rails along the plate assembly movement axis a sufficient distance towards the at least one coring assembly.

In an additional aspect, the invention is a method of coring out a portion of a food item blank, the method comprising: inserting at least one food item blank into a plate assembly, the plate assembly having at least one passage therein, the at least one passage extending to an exterior surface of the plate assembly; operating at least one coring assembly such that at least one coring bit of the at least one coring assembly is rotating; and inserting the at least one coring bit at least partially into the at least one passage so that it comes into contact with the at least one food item blank.

BRIEF DESCRIPTION OF THE DRAWINGS

The coring machine and related methods according to the present invention is further described with reference to the accompanying drawings, in which.

DETAILED DESCRIPTION OF THE PREFERRED EMBODIMENTS

Figure 1:
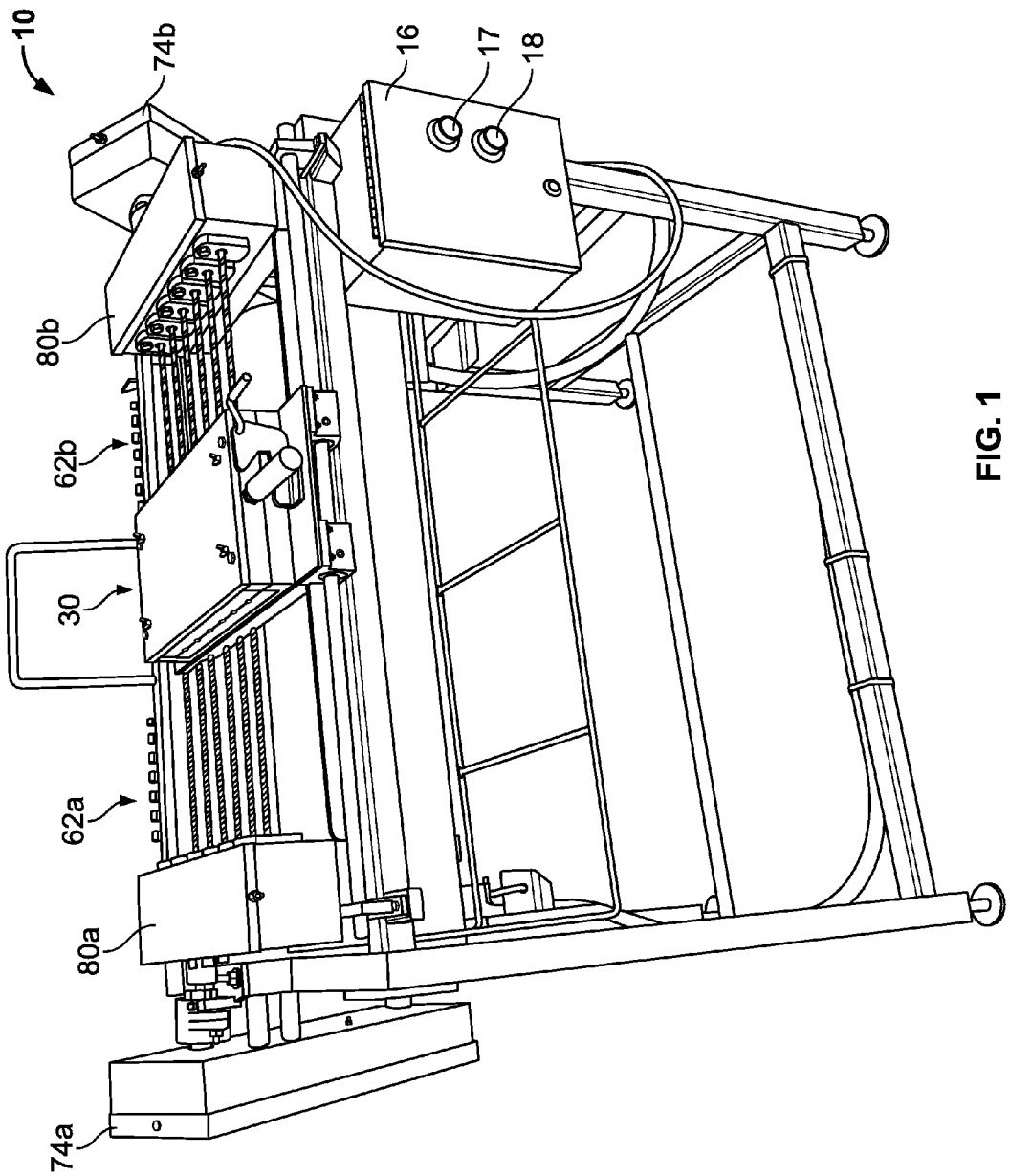
FIG. 1 is a front perspective view of a coring machine in accordance with the present invention.
Figure 2:
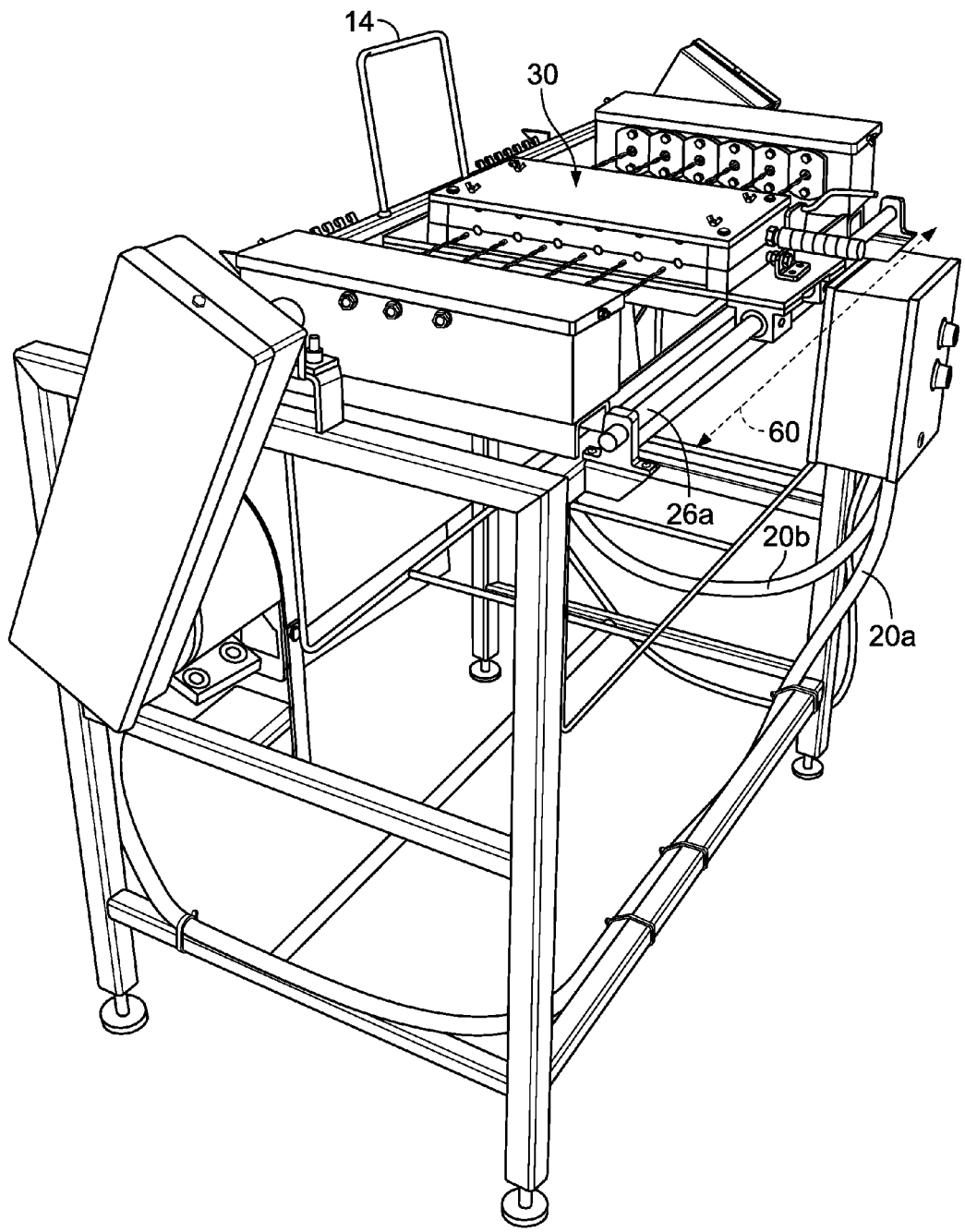
FIGS. 2 and 3 are side perspective views thereof.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It should be understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

The present invention is a device that is capable of creating a plurality of tubiform food products from a plurality of cylindrical food item blanks during a single production cycle. In one embodiment, as will be discussed in further detail below, the device is a coring machine comprising a plate assembly and a pair of coring assemblies that are attached to a frame. The plate assembly acts to hold the plurality of food item blanks in place between a top plate and bottom plate thereof, and is slideable in either direction along a pair of slide rails to engage either or both of the stationary coring assemblies. The coring assemblies are operated by a pair of motors, and each coring assembly includes a plurality of coring bits. The coring bits enter passages in the plate assembly and act to bore holes in the food item blanks, thereby forming the final food product.

The device of the present invention may be used for the manufacture of a tubular food product, for example an edible straw. Such edible straws may find utility as accessories or garnishes for mixed drinks, such as a Bloody Mary. The invention will be described in the context of a meat-based food product, but it should be understood that any food can serve as the basis for the tubular food product, such as those based on grains, vegetables, fruits, dairy products, or some combination of these categories of food items.

A food item blank is a generally solid amount of a foodstuff that is roughly shaped in a linear fashion. For purposes of use with the device and methods of the present application, the food item blank need only have a consistency that will hold the foodstuff together after the coring process. In some embodiments, the food item blank comprises a pre-cooked or otherwise preserved length of meat. In alternate embodiments, the food item blank is cooked or cured in the device before, during, or after the coring of the food item blank.

Referring generally to FIGS. 1-8, an embodiment of a coring machine 10 according to the present invention will be described in detail. In this embodiment, the coring machine 10 comprises a frame 12 which supports the elements of the coring machine 10 therefrom. In this embodiment, the frame 12 is designed as a floor-standing object. In alternate embodiments, the frame 12 could be used or modified to mount the coring machine 10 to a wall or ceiling.

The coring machine 10 generally includes a plate assembly 30 and a pair of coring assemblies 62a,62b. Coring assembly 62a is driven by a motor 22a (see FIG. 3), which is mounted to frame 12 and connects to coring assembly 62a via a drive belt assembly that is housed within drive belt housing 74a and a gear assembly (not shown) that is housed within a gear assembly housing 80a and that is directly connected to a plurality of coring bits of the coring assembly 62a (including coring bit 64a). Coring assembly 62b is driven by a motor 22b (see FIG. 3), which is mounted to frame 12 and connects to coring assembly 62b via a drive belt assembly that is housed within drive belt housing 74b and a gear assembly 82 that is housed within a gear assembly housing 80b and that is directly connected to a plurality of coring bits of the coring assembly 62b.

Besides relative orientations, it should be understood that the coring assemblies 62a,62b are identical to each other, that the drive belt assemblies contained in the drive belt housings 74a,74b are identical to each other, and that the gear assembly 82 that is contained in the gear assembly housing 80b is identical to the gear assembly that is contained in the gear assembly housing 80a. Only coring assembly 62a, the drive belt assembly that is contained in the drive belt housing 74b, and gear assembly 82 will be discussed hereinafter in detail, it being understood that all descriptions and discussions relating to coring assembly 62a are equally applicable to coring assembly 62b, all descriptions and discussions relating to the drive belt assembly contained in the drive belt housing 74b are equally applicable to the drive belt assembly contained in the drive belt housing 74a, and that all descriptions and discussions relating to gear assembly 82 are equally applicable to the gear assembly that is housed within the gear assembly housing 80a.

In this embodiment, the frame 12, drive belt housings 74a,74b, gear assembly housings 80a,80b, and all parts of the plate assembly 30 (except for the plates 40,44, as discussed below) are comprised of stainless steel. In alternate embodiments, other materials may be used for these parts besides stainless steel.

Figure 3:
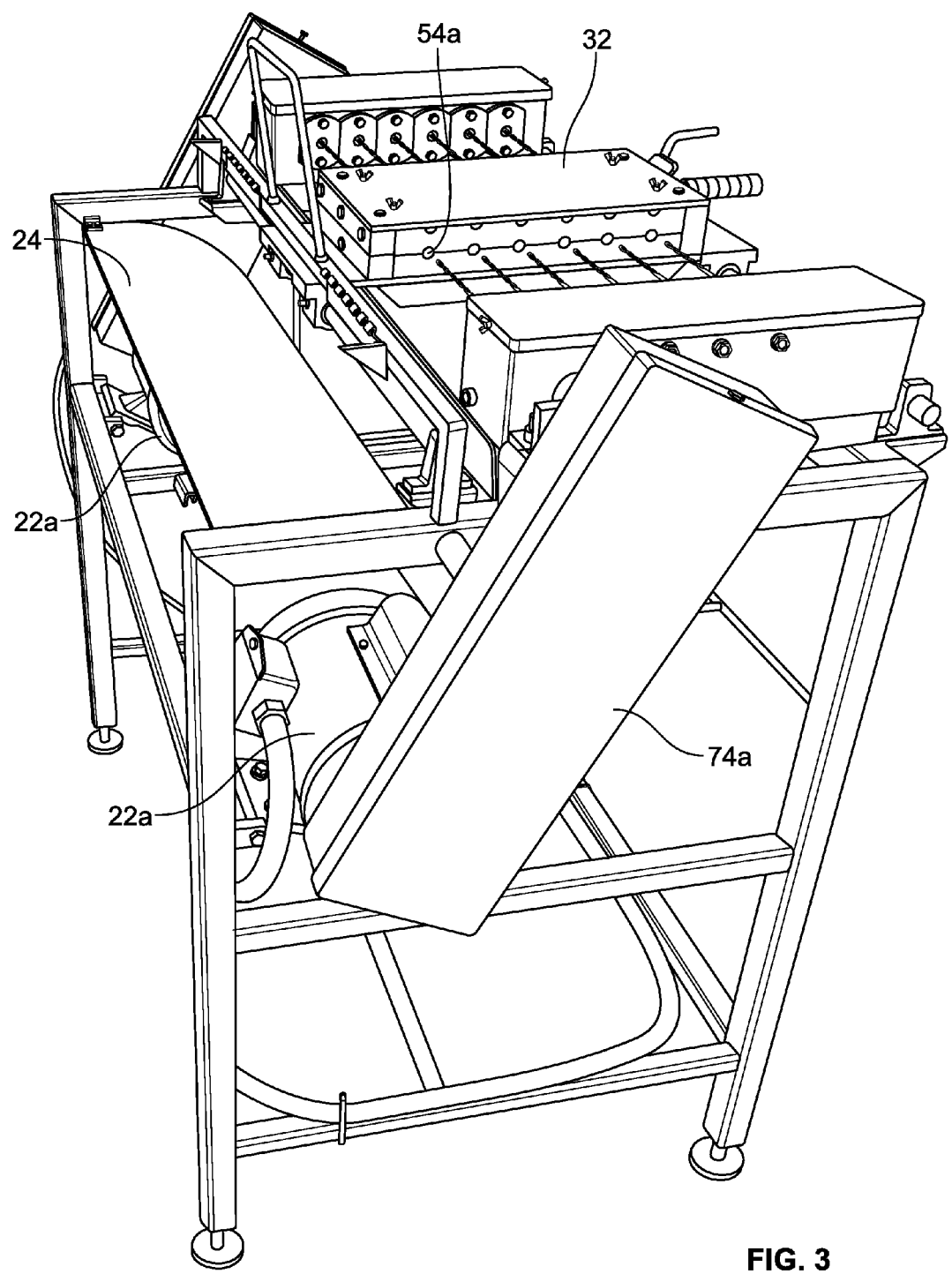
Figure 4:
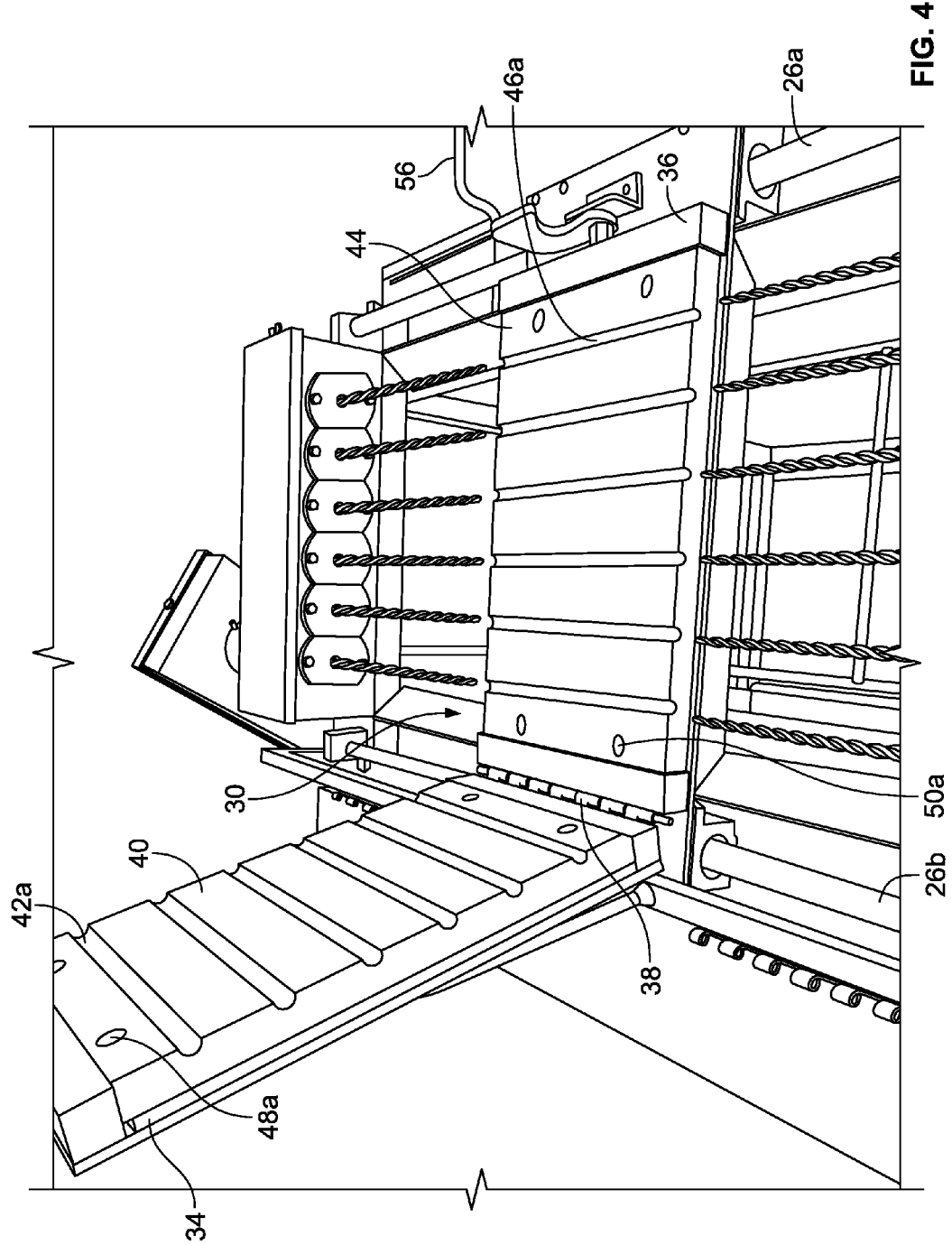
FIG. 4 is a side perspective view thereof, showing a plate assembly of the coring machine in its open configuration.

A control box 16 having an on button 17 and an off button 18 is mounted to the frame 12. Wire conduits 20a,20b, each containing power and control wires, run from the control box 16 to a respective one of the motors 22a,22b. The motors 22a,22b are simultaneously started and stopped via the control box 16. As seen in FIG. 3, a shield 24 is mounted to the frame 12 above the motors 22a,22b and protects the motors 22a,22b from falling liquids and food debris.

In this embodiment, a housing 32 of the plate assembly 30, and therefore the entire plate assembly 30, is slideably mounted to the frame 12 via a pair of slide rails 26a,26b. The slide rails 26a,26b are oriented parallel to each other and permit the plate assembly 30 to be moved in either direction along the plate assembly movement axis 60 (see FIG. 2). In alternate embodiments, the plate assembly 30 may be stationary, and one or both of the coring assemblies 62a,62b may be slideable along an axis in order to bring them into engagement with the plate assembly 30.

In this embodiment, the plate assembly 30 further includes a top plate frame 34 and a bottom plate frame 36, which are attached together via a hinge 38. The hinge 38 permits the plate assembly 30 to be selectively configured between an open configuration (see FIG. 4) and a closed configuration (see FIG. 6). A top plate 40 is removably mounted to the top plate frame 34 via a plurality of top plate bolts 48a-48d and corresponding top plate nuts 49a-49d (for clarity, only top plate bolt 48a and top plate nut 49a are labeled in the figures), and a bottom plate 44 is removably mounted to the bottom plate frame 36 via a plurality of bottom plate bolts 50a-50d and corresponding bottom plate nuts (for clarity, only bottom plate bolt 50a is labeled in the figures; bottom plate nuts not shown or labeled). The top plate 40 and bottom plate 44 may be removed from the plate assembly 30 periodically in order to permit the plates 40,44 to be cleaned or replaced. The plates 40,44 are preferably comprised of USDA- and/or FDA-approved materials for food production. For example, the plates 40,44 may be comprised of plastic or stainless steel.

Figure 5:
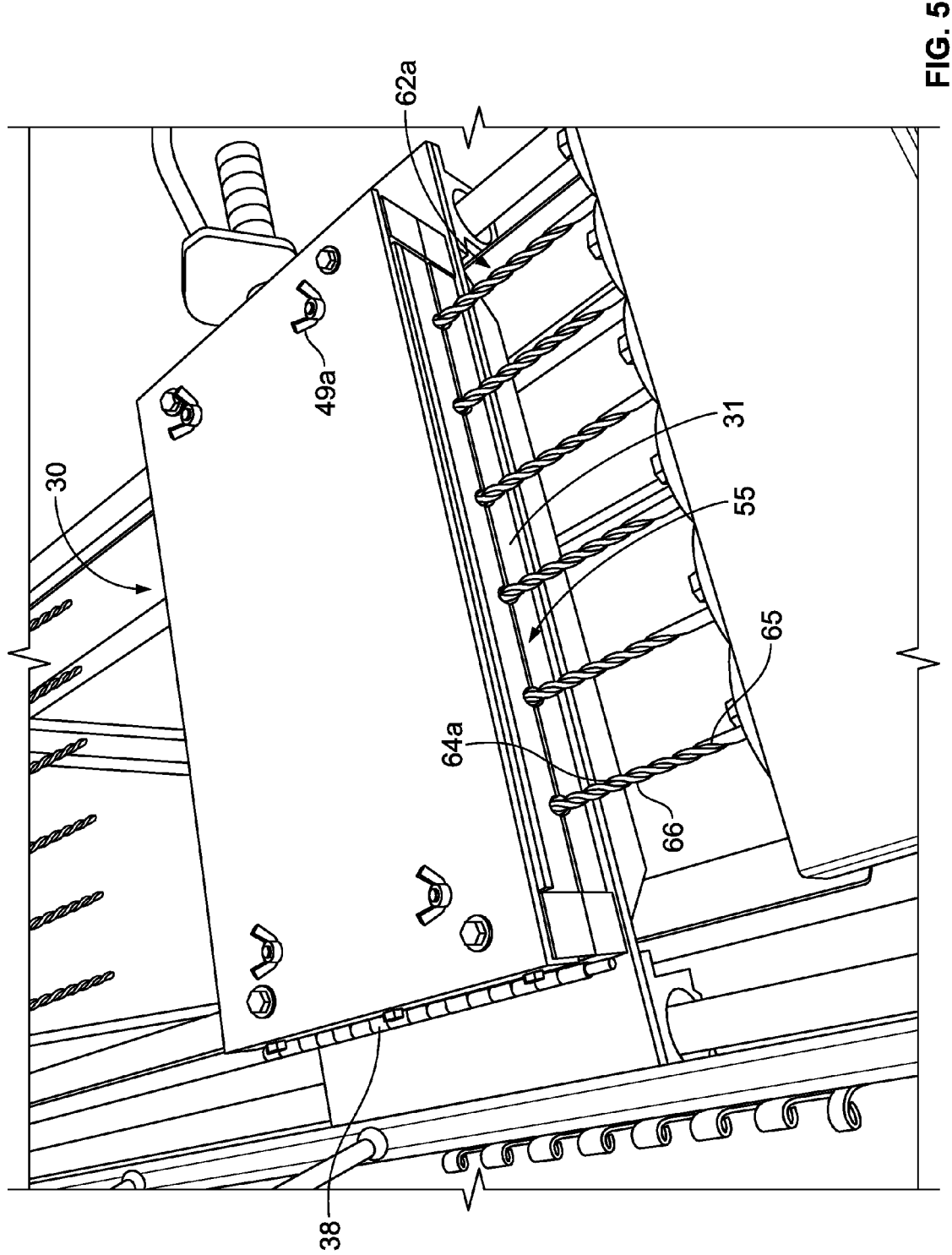
FIG. 5 is a top perspective views of the coring machine of FIG. 1, showing the plate assembly in its closed configuration.
Figure 6:
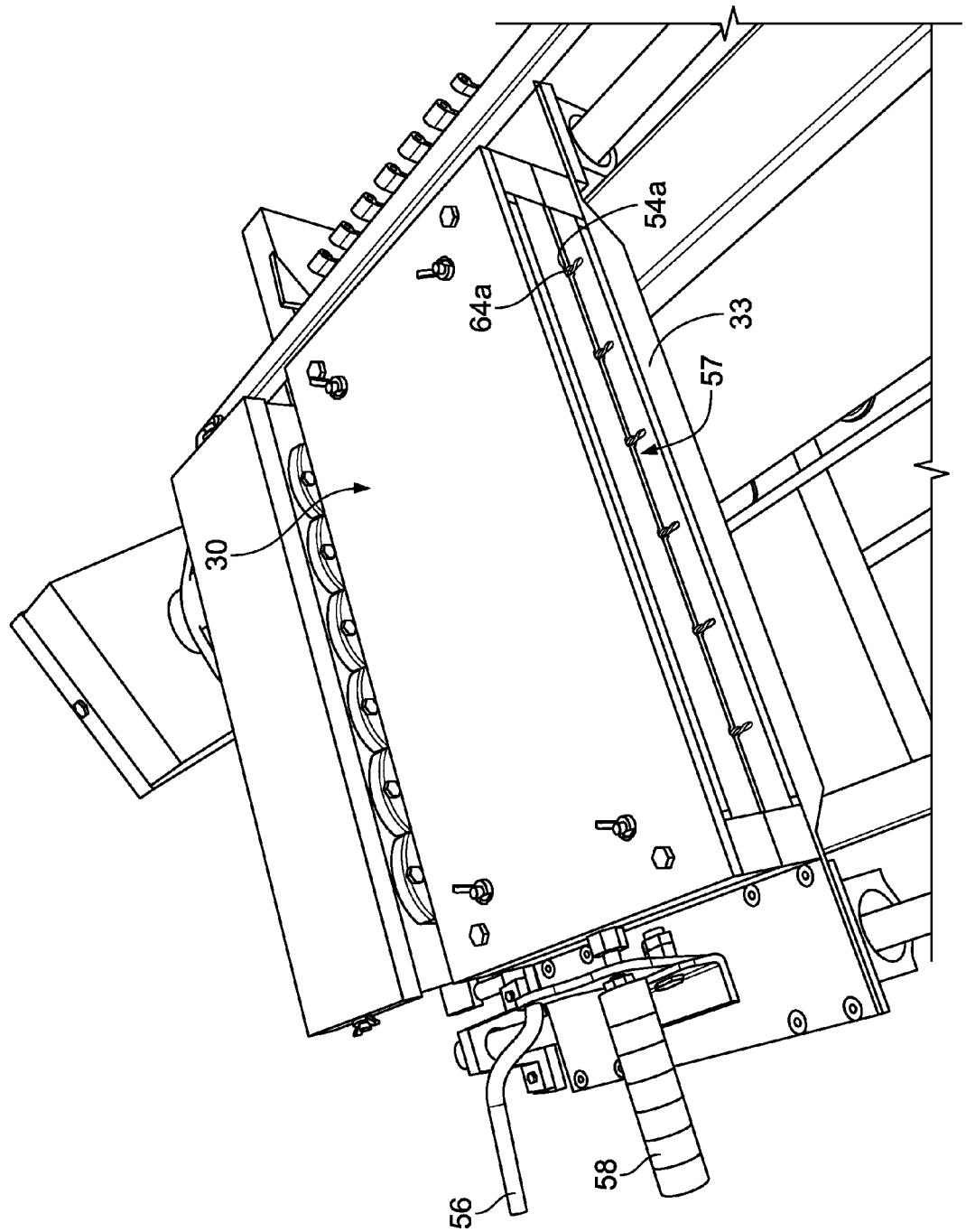
FIG. 6 is a top perspective view thereof, showing coring bits of a coring assembly of the coring machine located within passages of the plate assembly.
Figure 7:
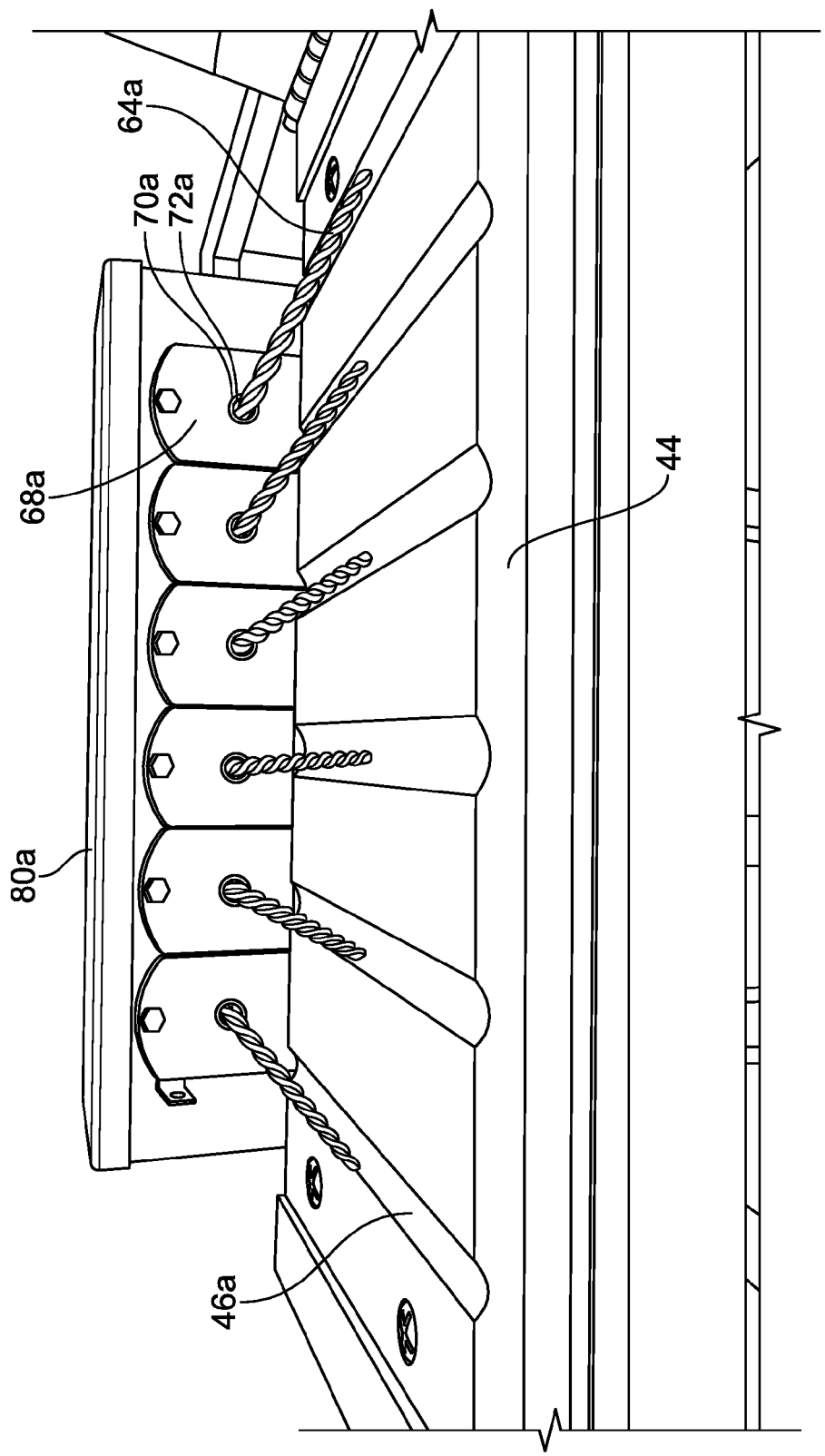
FIG. 7 is a side perspective view of the coring assembly and a bottom plate of the plate assembly, showing the coring bits of the coring assembly located within troughs of the bottom plate.

In this embodiment, top plate 40 includes a plurality of troughs 42a-42f (for clarity, only trough 42a is labeled in the figures), and bottom plate 44 includes a plurality of troughs 46a-46f (for clarity, only trough 46a is labeled in the figures). In this embodiment, each of the top plate 40 and bottom plate 44 has six troughs, though it should be understood that the plates may have a greater or lesser number of troughs in alternate embodiments. When the plate assembly 30 is in its closed configuration, as shown in FIGS. 3 and 5, the troughs 42a-42f of the top plate 40 and the troughs 46a-46f of the bottom plate 44 align to form a plurality of passages 54a-54f (for clarity, only passage 54a is labeled in the figures). The passages 54a-54f each extend to an exterior surface 55 of the plate assembly 30, which is located on a first side 31 of the plate assembly 30. The passages 54a-54f also extend to an exterior surface 57 of the plate assembly 30, which is located on a second side 33 of the plate assembly 30. In this embodiment, both the troughs 42a-42f of the top plate 40 and the troughs 46a-46f of the bottom plate 44 are semi-circular in cross-section so that the passages 54a-54f are circular in cross-section, in order to accommodate cylindrical food item blanks. In alternate embodiments, the troughs 42a-42f, 46a-f can be sized and shaped such that the resulting passages of the plate assembly are of any possible cross-sectional shape, for example square, rectangular, oval, triangular, hexagonal, octagonal, or star-shaped. In addition, the size and/or shape of the troughs 42a-42f of the top plate 40 and the troughs 46a-46f of the bottom plate 44 need not match.

To load the plate assembly 30 with food item blanks prior to the coring step, the plate assembly 30 is opened via hinge 38, food item blanks are loaded into one or more of the troughs 46a-46f of the bottom plate 44, and the top plate 40 is moved via hinge 38 so that the troughs 42a-42f of the top plate 40 are adjacent to and properly aligned with the troughs 46a-46f of the bottom plate 44 to collectively form the passages 54a-54f in which the food item blanks have been loaded. If there are minor differences in the dimensions of the food item blanks that have been loaded in the plate assembly 30, small shims may be used between the top plate 40 and the bottom plate 44 in order to make sure that the top plate 40 and bottom plate 44 are level (i.e., lie in parallel planes), prior to beginning the coring process. In this embodiment, a latch 56 is provided on the plate assembly 30 to permit the top plate 40 and bottom plate 44 to be temporarily secured together prior to the coring process. A handle 58 is also located on the front side of the plate assembly 30, which is used in this embodiment to manually move the plate assembly 30 along the plate assembly movement axis 60.

In this embodiment, the top plate 40 and bottom plate 44 are of single-piece construction. In alternate embodiments, the top plate and/or bottom plate may be comprised of multiple sub-plates, each having a different quantity and/or type of trough(s). The latch 56 may be used to hold these multiple sub-plates securely within the plate assembly 30 during the coring process.

As noted above, coring assembly 62a includes a plurality of coring bits 64a-64f (for clarity, only coring bit 64a is labeled in the figures) that are each axially aligned with one of the passages 54a-54f. In this embodiment, coring assembly 62a includes six coring bits (including coring bit 64a), though it should be understood that a greater or lesser number of coring bits may be used in the coring assembly 62a. Coring bit 64a has a shank 65 that attaches to the gear assembly 82 and a body 66 that performs the coring process. In some embodiments, the coring bits 64a-64f are drill bits of food-grade construction in accordance with USDA and/or FDA regulations. It should be understood that all of the coring bits 64a-64f of the coring assembly 62a (and of coring assembly 62b) in this embodiment are identical. In alternate embodiments, coring bits of different thicknesses, lengths, flute style and length, and/or shape could be used simultaneously or periodically in the coring assemblies 62a,62b.

As noted above, motor 22a provides rotational motion along a drive belt assembly that is located within the drive belt housing 74b. In this embodiment, the drive belt assembly is comprised of a pair of pulleys and a drive belt, which transfer the rotational motion generated by the motor 22a to an upper pulley that is connected to a drive shaft 84 that extends out of the drive belt housing 74b. The drive shaft 84 engages the gear assembly 82 via a jaw coupling 86, which may be for example an L Type jaw coupling produced by Lovejoy, Inc. of Downers Grove, Ill., U.S.A. The jaw coupling 86 assists in preventing the tension from the upper pulley of the drive belt assembly from interfering with the tension placed on the chain 90 and the coring bits.

Figure 8:
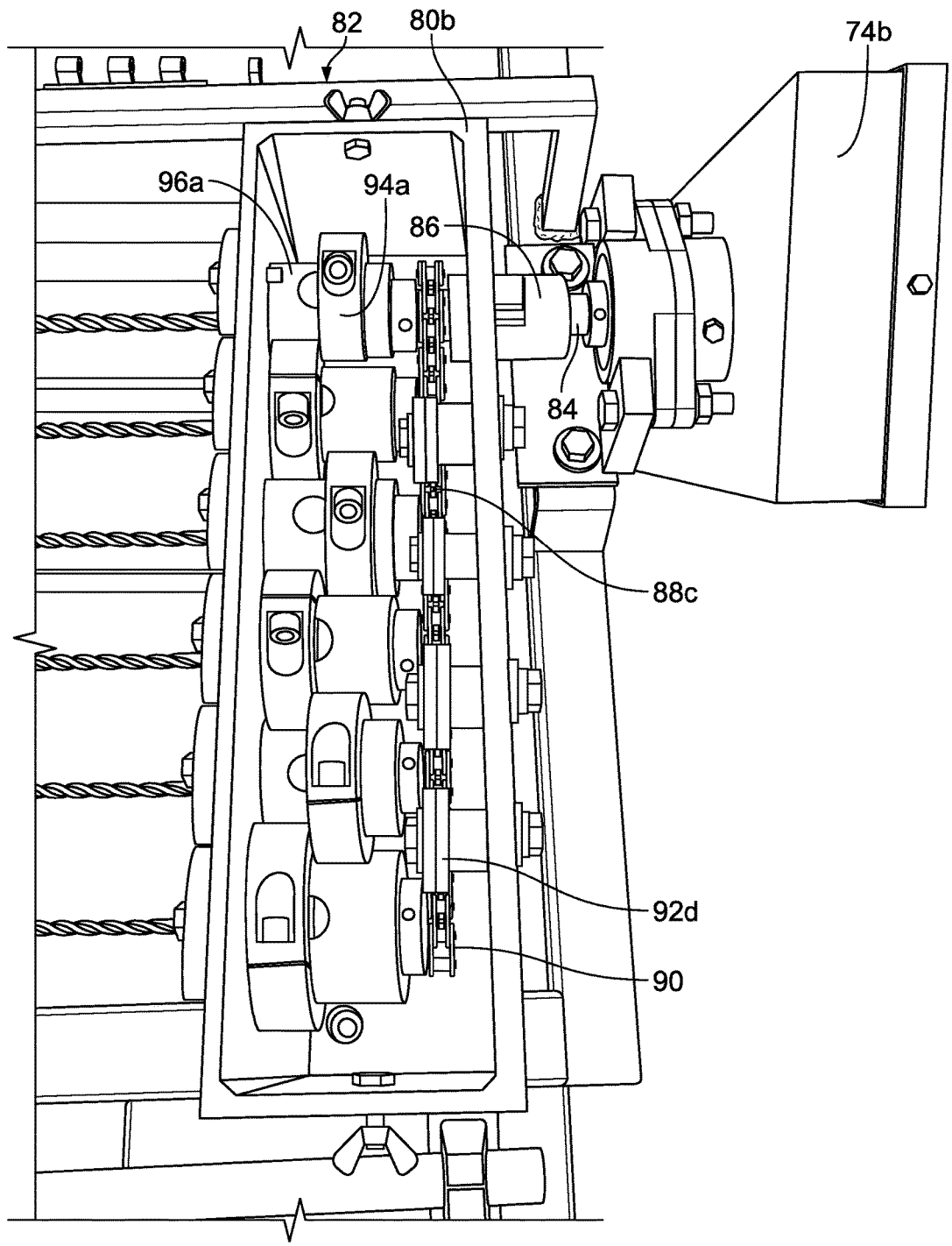
FIG. 8 is a top perspective view showing a gear assembly according to the present invention.

As shown in FIG. 8, the gear assembly 82 uses the rotational motion delivered via the drive shaft 84 to rotate a plurality of toothed gear shafts 88a-88f (for clarity, only toothed gear shaft 88c labeled in the figures) that are operationally connected together via chain 90. Each of the toothed gear shafts 88a-88f is coupled to one of the coring bits of the coring assembly 62b. A plurality of chain rollers 92a-92d (for clarity, only chain roller 92d is labeled in the figures) act to maintain the proper tension on the chain 90 and positioning of the chain 90. Each of the six coring bits is fixed within the gear assembly 82 via a pair of collars, an outside collar and an inside collar (for clarity, only outside collar 94a and inside collar 96a are labeled in the figures). There are two bearings located within each of the inside 96a-96f and outside 94a-94f collars. Each outside collar, e.g., outside collar 94a, is tightened against the respective inside collar, e.g., inside collar 96a, so that the respective shank of each coring bit is held tightly in place within the gear assembly 82.

Referring back to FIG. 7, a plurality of guard plates 68a-68f (for clarity, only guard plate 68a is labeled in the figures) are attached to the side of the gear assembly housing 80a around the shank of a respective one of the coring bits 64a-64f. The guard plates 68a-68f each have a respective shank hole 70a-70f (for clarity, only shank hole 70a is labeled in the figures). A respective washer 72a-72f (for clarity, only washer 72a is labeled in the figures) is placed in each shank hole 70a-70f so that any space between the shank of the respective coring bit 64a-64f is filled. The washers 72a-72f prevent liquids and food debris from entering the gear assembly housing 80a, and prevent oils and dirt from exiting the gear assembly housing 80a and contaminating the coring bits 64a-64f.

Figure 9:
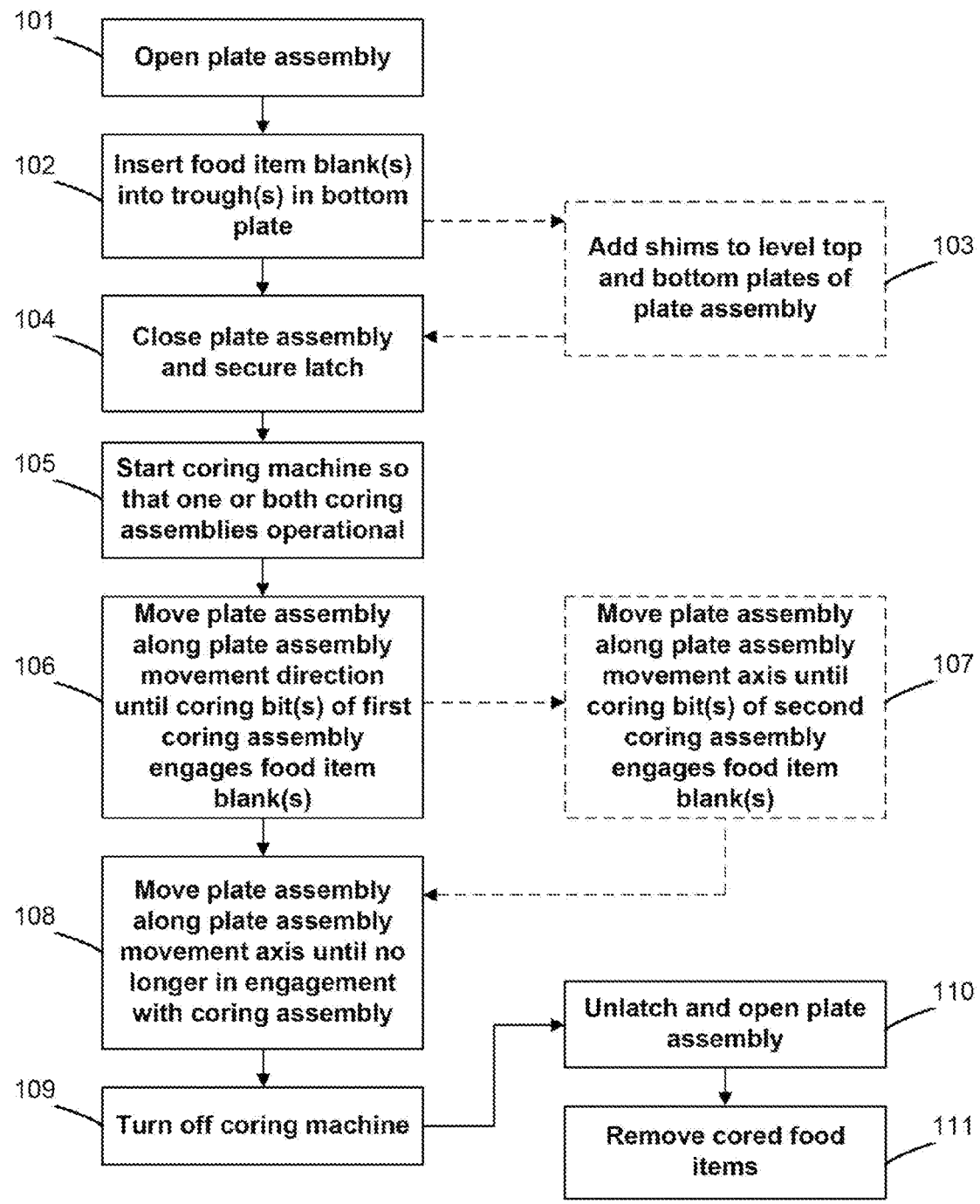
FIG. 9 is a flowchart showing steps of an embodiment of a method of using the coring machine according to the present invention.

An exemplary method of operating the coring machine 10 according to the present invention is illustrated in the flowchart of FIG. 9. In step 101, the plate assembly 30 is opened. In step 102, food item blank(s) are inserted into trough(s) 42a-42f of the bottom plate 44. As noted above, if necessary, in step 103 shims are placed between the top plate 40 and bottom plate 44 to ensure a level fit in step 104 when the plate assembly 30 is closed and latched. In step 105, the coring machine 10 is started via on button 17 of control box 16 so that the coring assemblies 62a,62b are operational (i.e., the coring bits thereof, including coring bits 64a-64f, are rotating). In step 106, the plate assembly 30 is moved along the plate assembly movement axis 60 until the coring bit(s) 64a-64f of the first coring assembly 62a engage the food item blanks located within the plate assembly 30, and the coring bit(s) 64a-64f have removed a desired amount of food material from the food item blanks. Optionally, and only where there is a second coring assembly 62b, the plate assembly 30 is then moved in step 107 along the plate assembly movement axis 60 in the opposite direction until the coring bit(s) of the second coring assembly 62b engage the food item blanks located within the plate assembly 30, and the coring bit(s) have removed a desired amount of food material from the food item blanks. In step 108, the plate assembly 30 is moved along the plate assembly movement axis 60 until it is no longer in engagement with coring assembly 62a or coring assemblies 62a,62b. In step 109, the coring machine 10 is turned off via off button 18. In step 110, latch 56 is released and the plate assembly 30 is opened. In step 111, the cored food items are removed from the plate assembly 30. The method may then be repeated, if desired, by returning to step 101.

In the embodiments of the invention discussed herein, the food item blanks are manually loaded into the plate assembly 30 and the finished (cored) products are manually removed from the plate assembly 30, and the plate assembly 30 is manually moved along the plate assembly movement axis 60 in order to engage the coring assemblies 62a,62b and core the food item blanks. It should be understood that in alternate embodiments the food item blanks and/or finished (cored) products could be loaded into and removed from the plate assembly 30 in an automated fashion and/or the plate assembly 30 could be automatically moved along the plate assembly movement axis 60 in order to engage the coring assemblies 62a,62b and core the food item blanks.

In the present embodiment, the plate assembly 30 of the coring device 10 is adapted for use with the two coring assemblies 62a,62b comprising coring bits 64a-64f, which are used to core the holes in the food item blanks from either or both ends of the plate assembly 30. In alternate embodiments, the coring assemblies 62a,62b may include alternate cutting devices, for example knives, corers, water jets, or sonic knives. In the present embodiment, the plate assembly 30 is moved sequentially between the coring assemblies 62a,62b such that it can engage only one of the coring assemblies 62a,62b at a time. In alternate embodiments, the coring assemblies 62a,62b could engage the plate assembly 30 in unison such that they cut into the food item blank simultaneously.

Although exemplary implementation(s) of the herein described device(s) and/or method(s) have been described in detail above, those skilled in the art will readily appreciate that many additional modifications are possible in the exemplary embodiments without materially departing from the novel teachings and advantages of the herein described device(s) and/or method(s). Accordingly, these and all such modifications are intended to be included within the scope of the herein described device(s) and/or method(s). The herein described device(s) and/or method(s) may be better defined by the following exemplary claims.

What is claimed is:

1. A machine comprising:
   a frame;
   a plate assembly that is connected to the frame and operationally configured to releasably support at least one food item blank, the plate assembly comprising at least one passage therein, the at least one passage extending from a first exterior surface of the plate assembly to a second exterior surface of the plate assembly;
   a first coring assembly that is connected to the frame and located on a first side of the plate assembly corresponding to the first exterior surface, the first coring assembly comprising at least one coring bit that is axially aligned with the at least one passage such that the at least one coring bit of the first coring assembly can be at least partially inserted within the at least one passage; and
   a second coring assembly that is connected to the frame and located on a second side of the plate assembly corresponding to the second exterior surface, the second coring assembly comprising at least one coring bit that is axially aligned with the at least one passage such that the at least one coring bit of the second coring assembly can be at least partially inserted within the at least one passage.

2. The machine of claim 1, wherein the at least one coring assembly is stationary and the plate assembly is slideable along the frame in order to permit the at least one coring bit to become at least partially inserted within the at least one passage.

3. The machine of claim 1, wherein the at least one coring bit of the first coring assembly, the at least one coring bit of the second coring assembly, and the at least one passage are axially aligned.

4. The machine of claim 1, wherein the plate assembly is stationary and the first coring assembly is slideable along the frame in order to permit the at least one coring bit of the first coring assembly to become at least partially inserted within the at least one passage.

5. The machine of claim 1, the at least one coring bit of the first coring assembly comprising a plurality of coring bits and the at least one passage comprising a plurality of passages, wherein each of the coring bits of the plurality of coring bits of the first coring assembly is axially aligned with a respective one of the passages of the plurality of passages.

6. The machine of claim 1, wherein the at least one passage is cylindrical in shape.

7. The machine of claim 1, wherein the plate assembly has a top plate and a bottom plate that are connected together by a hinge, the hinge permitting the plate assembly to be selectively configured between an open configuration and a closed configuration.

8. The machine of claim 7, the plate assembly further comprising a latch that permits the top plate and the bottom plate to be temporarily secured together.

9. The machine of claim 1, the plate assembly comprising a top plate and a bottom plate, the top plate having at least one trough and the bottom plate having at least one trough, wherein when the plate assembly is in a closed configuration, the at least one trough of the top plate and the at least one trough of the bottom plate collectively form the at least one passage.

10. The machine of claim 9, wherein either or both of the top plate and the bottom plate are removable from the plate assembly.

11. A machine comprising:
    a frame including a pair of slide rails;
    a plate assembly, the plate assembly being slideably connected to the frame along the pair of slide rails along a plate assembly movement axis and operationally configured to releasably support at least one food item blank, the plate assembly including at least one passage therein, the at least one passage extending from a first exterior surface of the plate assembly to a second exterior surface of the plate assembly;
    a first coring assembly that is fixedly connected to the frame and located on a first side of the plate assembly corresponding to the first exterior surface, the first coring assembly including at least one coring bit that is axially aligned with the at least one passage such that the at least one coring bit of the first coring assembly is at least partially inserted within the at least one passage when the plate assembly is slid along the pair of slide rails along the plate assembly movement axis a sufficient distance towards the first coring assembly; and
    a second coring assembly that is fixedly connected to the frame and located on a second side of the plate assembly corresponding to the second exterior surface, the second coring assembly including at least one coring bit that is axially aligned with the at least one passage such that the at least one coring bit of the second coring assembly is at least partially inserted within the at least one passage when the plate assembly is slid along the pair of slide rails along the plate assembly movement axis a sufficient distance towards the second coring assembly.

12. The machine of claim 11, wherein the at least one coring bit of the first coring assembly, the at least one coring bit of the second coring assembly, and the at least one passage are axially aligned such that the at least one coring bit of the first coring assembly is at least partially inserted within the at least one passage when the plate assembly is slid along the pair of slide rails along the plate assembly movement axis a sufficient distance towards the first coring assembly and the at least one coring bit of the second coring assembly is at least partially inserted within the at least one passage when the plate assembly is slid along the pair of slide rails along the plate assembly movement axis a sufficient distance towards the second coring assembly.

13. The machine of claim 11, the plate assembly further comprising a top plate and a bottom plate, the top plate having at least one trough and the bottom plate having at least one trough, wherein when the plate assembly is in a closed configuration, the at least one trough of the top plate and the at least one trough of the bottom plate collectively form the at least one passage.

* * * * *